United States Patent [19]
Göhna

[11] Patent Number: 5,934,897
[45] Date of Patent: Aug. 10, 1999

[54] REACTOR FOR THE AUTOTHERMAL CONVERSION OF HYDROCARBONS

[75] Inventor: Hermann Göhna, Bad Soden, Germany

[73] Assignee: Metallgesellschaft Aktiengesellschaft, Frankfurt am Main, Germany

[21] Appl. No.: 08/963,338

[22] Filed: Nov. 3, 1997

[30] Foreign Application Priority Data

Nov. 7, 1996 [DE] Germany .............. 196 45 855

[51] Int. Cl.$^6$ ............................................. F23D 14/46
[52] U.S. Cl. ................... 431/350; 431/346; 431/354
[58] Field of Search ........................... 431/350, 352, 431/346, 114, 354, 353

[56] References Cited

U.S. PATENT DOCUMENTS 3,094,978  6/1963  McCray ......................... 431/346
3,923,446 12/1975  Budden et al. ................ 431/114
4,400,180  8/1983  Marion et al. .

FOREIGN PATENT DOCUMENTS 36 12 218   4/1986  Germany .
43 44 535  12/1993  Germany .
52150776  12/1977  Japan .

OTHER PUBLICATIONS

B. Elvers et al, "Ullmann's Encyclopedia of Industrial Chemistry", vol. A12, 1990, XP002085682.

*Primary Examiner*—James C. Yeung
*Attorney, Agent, or Firm*—Sprung Kramer Schaefer & Briscoe

[57] ABSTRACT

A reactor comprises at least one burner, to which hydrocarbonaceous gas and gas rich in $O_2$ are supplied. The hydrocarbonaceous gas is supplied to the burner through a transfer line at temperatures of 100 to 1300° C. and a pressure in the range from 10 to 70 bar. Adjacent the orifice end of the transfer line, which is connected with the burner, there is provided a screen-like perforated wall through which the hy-drocarbonaceous gas can flow. This wall ensures a uniform gas flow in the burner, and at the same time it prevents solid matter from a certain size onwards from penetrating into the sensitive portion of the burner and settling there.

2 Claims, 1 Drawing Sheet

REACTOR FOR THE AUTOTHERMAL CONVERSION OF HYDROCARBONS

BACKGROUND OF THE INVENTION

This invention relates to a reactor for the autothermal con-version of a hydrocarbonaceous gas with a gas rich in $O_2$ at a maximum temperature of 1200 to 1800° C., where the hydrocarbonaceous gas is supplied through a transfer line at temperatures of 100 to 1300° C. and a pressure in the range from 10 to 70 bar and enters at least one burner associated to the reactor to which the gas rich in $O_2$ is also supplied through a line.

The reactor of this type is known and described for instance in Ullmann's Encyclopedia of Industrial Chemistry, Vol. A12, pp. 202 to 204. Details of the transfer line are known from the German Patent 44 31 954. In the operation of these reactors it turned out that malfunctions may occur in the area of the burner, which impede the uniform gas flow in the burner. This may lead to damages in the orifice portion of the burner, and there are undesired temperature peaks in the reactor and in particular in the upper portion of the catalyst bed.

SUMMARY OF THE INVENTION

The object underlying the invention is to increase the operational safety of the reactor in a simple and inexpensive manner. In accordance with the invention this is achieved in the above-mentioned reactor in that adjacent the orifice end of the transfer line, which is connected with the burner, a screen-like perforated wall is provided, through which the hydrocarbonaceous gas can flow. This wall provides for a uniform gas flow in the burner. At the same time, the wall prevents foreign matter from a certain size onwards from penetrating into the sensitive portion of the burner and settling there. Such disturbing solid matter may for instance be fragments of the wall of the transfer line. Such fragments result for instance from the considerable thermal expansions to which the transfer line is usually exposed.

The screen-like perforated wall may be designed and mounted in different ways, so as to develop the desired effect. One of the possibilities is to provide the wall in an inlet chamber disposed in the burner and connected with the transfer line. Advantageously, the inlet chamber is designed as an annular chamber, which surrounds the line for the gas rich in $O_2$. The screen-like wall may be cylindrical and be disposed in the annular chamber coaxially with respect to the line carry-ing the gas rich in $O_2$. The cylindrical wall advantageously ensures a uniform distribution of the hydrocarbonaceous gas flowing to the orifice of the burner.

The wall may for instance be made of alloy steel or ceramics.

The temperatures of the gas flowing through the transfer line into the burner lie in the range from 100 to 1300° C., and are frequently at least 500° C. The gas supplied to the burner through the transfer line may for instance be preheated natural gas, and the natural gas may also be mixed with a reformed gas, which originates from a tubular reactor which serves the steam reforming of hydrocarbons. The reformed gas coming from the tubular reactor is then rich in $H_2$ and CO and usually also contains methane.

Embodiments of the process will now be explained with reference to the drawing, wherein:

DETAILED DESCRIPTION OF THE INVENTION

Figure 1:
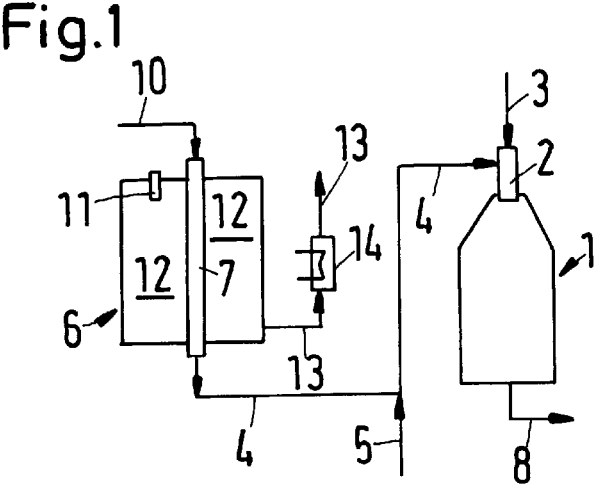
FIG. 1 is a schematic representation of the coupling of a tubular reactor with reactor for the autothermal conversion of hydrocarbons.

FIG. 1 shows a schematic representation of the reactor 1 for the autothermal conversion of hydrocarbonaceous gas with a gas rich in $O_2$. In the following, the reactor is briefly referred to as an "autothermal reactor". At its upper end, the reactor 1 has a burner 2, to which gas rich in $O_2$, e.g. techni-cally pure oxygen, is supplied via line 3. The transfer line 4 supplies hydrocarbonaceous gas, which in the example of FIG. 1 partly comes from a tubular reactor 6, which is known per se and serves for the steam reforming of hydrocarbons. In addition, hydrocarbons, e.g. natural gas, may be supplied to the transfer line 4 through line 5. In a manner known per se the reactor 1 is provided with the bed of a granular nickel catalyst. The hot gas coming from the burner 2 flows through this catalyst bed, so that a product gas rich in $H_2$ and CO is formed, which is withdrawn via line 8. This product gas may be for instance wholly or partly used for methanol synthesis.

The tubular reactor 6 comprises numerous tubes 7, in which there is provided a bed of a nickel catalyst. A convertible mixture of hydrocarbons, e.g. natural gas, and steam is supplied via line 10. The endothermal reaction taking place in the tubes 7 is made possible through an indirect heating. This heating is provided by numerous burners 11, whose supply lines are not represented. Hot combustion gas in the combustion chamber 12 is heating the tubes 7 and finally flows off through line 13, where sensible heat is utilized in the heat exchanger 14.

Figure 3:
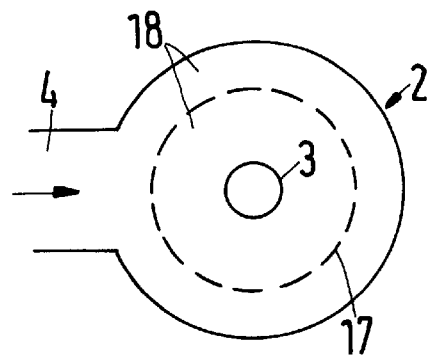
FIG. 3 shows a cross-section along line III—III of FIG. 2.
Figure 2:
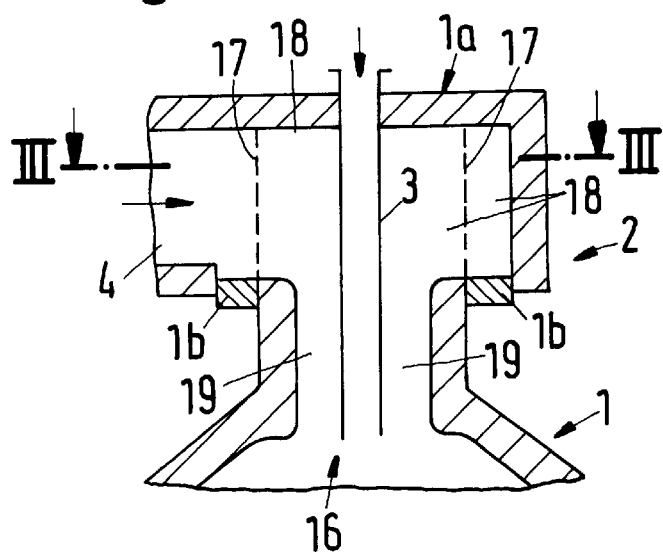
FIG. 2 shows the invent e burner of the reactor in a longitudinal section.

Details of the burner 2 are shown in FIGS. 2 and 3. The gas rich in $O_2$ flows downwards through line 3 to the burner orifice 16. Through the transfer line 4 the hydrocarbonaceous gas is supplied, and it first of all flows through a cylindrical, screenlike perforated wall 17. This wall is disposed in an annular chamber 18, which surrounds the line 3. From the annular chamber 18 an annular gap 19 leads to the burner orifice 16. Adjacent the orifice 16, the gas from the annular gap 19 meets the gas rich in $O_2$ coming from line 13, so that exothermal reactions start by forming flames. In the reactor 1, the gas mixture then flows downwards through a catalyst bed, which is not represented in FIG. 2.

The perforated cylindrical wall 17 ensures a fairly uniform gas distribution, in particular in the annular gap 19. At the same time, the wall 17 retains any major solid matter accumu-lating in flow direction in front of the wall. The housing 1a, which constitutes the outside of the burner 2, has a housing ring 1b, which is detachably mounted and is removed from time to time, so as to withdraw solid matter accumulated in front of the wall 17. This may be done during a short interruption of the operation.

Figure 4:
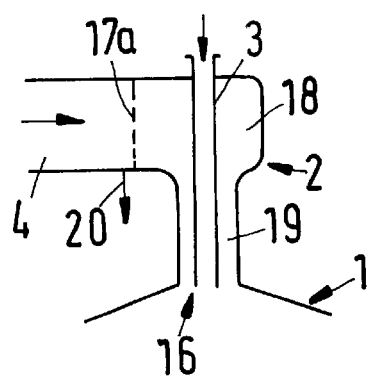
FIG. 4 shows a further variant of the embodiment of the burner in a longitudinal section in a schematic representation.

In the simplified embodiment in accordance with FIG. 4, the screenlike perforated wall 17a is vertical and without curvature. It prevents solid matter from getting into the burner 2 from the orifice portion of the transfer line 4. Accumulated solid matter is withdrawn in front of the wall 17a rough a not represented, sealable opening in direction of e arrow 20. Moreover, the reference numerals indicated in FIG. 4 have the meaning already explained in conjunction with FIGS. 2 and 3.

I claim:

1. A reactor for the autothermal conversion of a hydrocarbonaceous gas with a gas rich in $O_2$ at a maximum temperature of 1200 to 1800° C., wherein the hydrocarbonaceous gas is supplied through a transfer line at temperatures of 100 to 1300° C. and a pressure in the range from 10 to 70 bar and enters a burner to which the gas rich in $O_2$ is also supplied through a central line, wherein adjacent an orifice end of the transfer line, which is connected with the burner, a screenlike perforated wall is provided through which the hydrocarbonaceous gas flows, wherein said screen-like wall is provided in an inlet chamber connected to the transfer line and disposed in said burner, wherein the inlet chamber constitutes an annular chamber surrounding the central line, and wherein said screen-like wall is cylindrical and is disposed in the annular chamber coaxially with respect to said central line.

2. The reactor as claimed in claim 1, further comprising a sealable opening in the flow direction in front of the screenlike perforated wall for removing solid matter.

* * * * *